United States Patent [19]
Kitsugi et al.

[11] 3,947,284
[45] Mar. 30, 1976

[54] METHOD FOR SOLIDIFYING SLUDGE

[75] Inventors: Kyoichi Kitsugi; Seizo Kozeki, both of Tokyo, Japan

[73] Assignee: Onoda Cement Company, Limited, Yamaguchi, Japan

[22] Filed: Sept. 3, 1974

[21] Appl. No.: 502,533

[30] Foreign Application Priority Data
Sept. 21, 1973  Japan............................. 48-105969

[52] U.S. Cl. .................... 106/89; 106/90; 106/315; 106/96
[51] Int. Cl.² ...................... C04B 7/02; C04B 7/35
[58] Field of Search .................. 106/89, 90, 96, 315

[56] References Cited
UNITED STATES PATENTS

| | | | |
|---|---|---|---|
| 196,971 | 11/1877 | Coughlin............................. | 106/89 |
| 1,760,713 | 5/1930 | Ochs................................... | 106/96 |
| 2,806,530 | 9/1957 | Binkley et al....................... | 106/89 |
| 3,720,609 | 3/1973 | Smith et al.......................... | 210/59 |

FOREIGN PATENTS OR APPLICATIONS

| | | | |
|---|---|---|---|
| 21,793 | 7/1970 | Japan................................. | 210/42 |
| 31,869 | 11/1972 | Japan................................. | 210/46 |
| 574,088 | 4/1959 | Canada.............................. | 106/89 |
| 574,081 | 4/1959 | Canada.............................. | 106/89 |

*Primary Examiner*—Patrick P. Garvin
*Assistant Examiner*—John P. Sheehan
*Attorney, Agent, or Firm*—Oblon, Fisher, Spivak, McClelland & Maier

[57] ABSTRACT

A sludge having a water/solid high ratio and containing a substance having a harmful influence upon the setting of portland cement is solidified by mixing the sludge with hydraulic portland cement and at least one substance selected from the group consisting of alkali sulphate, gypsum dihydrate and insoluble gypsum anhydride.

4 Claims, No Drawings

METHOD FOR SOLIDIFYING SLUDGE

BACKGROUND OF THE INVENTION

This invention relates to an improved method for solidifying a sludge containing substances, which give harmful effect on the setting of normal portland cement or cement composed of portland cement ground (hereinafter abridged to hydraulic portland cement), for example an organic substance such as a sugar, a cracked petroleum substance, a fat and a humic substance; an oxide, a sulfide, a chloride and a hydroxide of copper, lead, zinc and the like (hereinafter abridged to an inorganic compound of copper, lead, zinc or the like); phosphoric acid, an inorganic phosphate and an organic phosphorus compound such as parathion (hereinafter abridged to a phosphorus compound).

Throughout this invention, the "sludge" means a sludge which had a water/solid high ratio and contained a substance having a harmful influence upon the setting of portland cement or cement composed of portland cement ground, for example, 1) a sand, a silt, a clay or colloidal particles which settled on the bottom of a river, a marsh, a lake, a harbor or a bay and contained an organic compound such as a sugar; a cracked petroleum substance; a fat; a humic substance; an oxide, a sulfide, a chloride or a hydroxide of copper, lead, zinc and the like; phosphoric acid; an inorganic phosphate or an organic phosphorus compound such as parathion; 2) a mud which contained various kind of substances which were discharged from a metal mine.

It has been widely applied to solidify a sludge containing water by mixing hydraulic portland cement such as normal portland cement, high early strength portland cement and superhigh early strength portland cement and mixed portland cement such as silica cement and blast furnace slag cement to the sludge. The sludge containing the above substances which give harmful effect on the setting of hydraulic portland cement can not be solidified by the addition of the hydraulic portland cement. Even if the sludge may be able to be solidified by the addition of the hydraulic portland cement, unconfined compressive strength of the solidified body will become flimsy with lapse of time and will be broken down finally.

One object of the present invention is to solidify a sludge containing the above described organic substances, inorganic compounds of copper, lead and zinc, or phosphorus compounds in a short time.

Another object of the present invention is to provide a solidified body which is stable for long time.

These objects can be attained by adding hydraulic portland cement and at least one compound selected from the group of compounds consisting of sodium or potassium sulphate, gypsum dihydrate gypsum hemihydrate, soluble gypsum anhydride and gypsum anhydride (anhydrite) to a sludge.

Hereunder, only typical representatives selected from many experiments carried out will be reviewed.

Table 1 shows the results obtained when the various rates of normal portland cement and anhydrous Glauber's salt were mixed to a sludge which contained 84% of water therein and contained polymerized phosphates such as $Na_5P_3O_{10}$ at the rate of 4.5 mg/l based on P in the phosphates.

Table 1

| Weight percent portland cement and Glauber's salt in sludge mixture | Days After Mixing (Days) | Unconfined compressive strength (qu) of Solidified Body (kg/cm²) $Na_2SO_4$ % in the Mixture of Normal Portland Cement and Glauber's salt (%) | | | | | | | | | |
|---|---|---|---|---|---|---|---|---|---|---|---|
| | | 0 | 5 | 10 | 15 | 20 | 25 | 30 | 40 | 50 | 60 |
| 10 | 1 | 0 | 0.1 | 0.2 | 0.7 | 0.8 | 0.6 | 0.4 | 0.3 | 0.1 | 0 |
| | 3 | 0 | 0.1 | 0.5 | 1.2 | 1.2 | 0.8 | 0.7 | 0.5 | 0.2 | 0 |
| | 7 | 0 | 0.4 | 0.7 | 1.5 | 1.2 | 0.8 | 0.7 | 0.6 | 0.2 | 0 |
| 15 | 1 | 0 | 0.3 | 1.4 | 2.8 | 3.4 | 2.6 | 2.5 | 1.8 | 1.2 | 0.1 |
| | 3 | 0 | 0.4 | 2.5 | 4.8 | 5.3 | 3.6 | 3.2 | 2.2 | 1.5 | 0.1 |
| | 7 | 0 | 1.0 | 3.0 | 5.3 | 5.7 | 3.8 | 3.5 | 2.4 | 1.5 | 0.1 |
| 20 | 1 | 0 | 0.6 | 4.3 | 7.3 | 8.3 | 6.9 | 6.3 | 3.0 | 1.3 | 0.1 |
| | 3 | 0 | 1.1 | 5.0 | 9.8 | 9.8 | 8.5 | 8.0 | 4.1 | 1.8 | 0.2 |
| | 7 | 0 | 1.7 | 5.8 | 10.6 | 10.3 | 9.2 | 8.5 | 4.3 | 1.8 | 0.2 |

Table 2 shows the results when the various rates of normal portland cement and various kinds of gypsum were mixed to the same sludge as the above.

Table 2

| Gypsum | Mixing ratio (%) Normal Portland Cement | Gypsum | Amount added to Sludge (%) | qu (kg/cm²) 1 Day | 3 Days | 7 Days |
|---|---|---|---|---|---|---|
| Insoluble Gypsum Anhydride | 100 | 0 | 15 | 0 | 0 | 0 |
| | 90 | 10 | " | 0.8 | 1.0 | 1.0 |
| | 80 | 20 | " | 2.0 | 2.3 | 2.3 |
| | 70 | 30 | " | 1.8 | 3.0 | 3.4 |
| | 60 | 40 | " | 0.6 | 2.5 | 2.6 |
| | 40 | 60 | " | 0.4 | 0.8 | 0.8 |
| | 20 | 80 | " | 0 | 0 | 0 |
| Soluble Gypsum Anhydride | 100 | 0 | " | 0 | 0 | 0 |
| | 90 | 10 | " | 0.4 | 0.6 | 0.6 |
| | 80 | 20 | " | 1.0 | 1.3 | 1.3 |
| | 70 | 30 | " | 0.4 | 0.9 | 1.0 |
| | 60 | 40 | " | 0.3 | 0.8 | 1.0 |
| | 40 | 60 | " | 0 | 0 | 0 |
| | 20 | 80 | " | 0 | 0 | 0 |
| Gypsum Hemi-Hydrate | 100 | 0 | " | 0 | 0 | 0 |
| | 90 | 10 | " | 0.3 | 0.4 | 0.5 |
| | 80 | 20 | " | 0.6 | 0.7 | 0.8 |
| | 70 | 30 | " | 0.8 | 0.9 | 1.0 |
| | 60 | 40 | " | 0.5 | 0.6 | 0.6 |
| | 40 | 60 | " | 0.2 | 0.3 | 0.3 |
| | 20 | 80 | " | 0 | 0 | 0 |
| Gypsum di-Hydrate | 100 | 0 | " | 0 | 0 | 0 |
| | 90 | 10 | " | 0.5 | 0.6 | 0.7 |
| | 80 | 20 | " | 1.6 | 1.8 | 2.0 |
| | 70 | 30 | " | 2.8 | 3.5 | 3.3 |
| | 60 | 40 | " | 0.8 | 2.1 | 2.4 |
| | 40 | 60 | " | 0.2 | 0.4 | 0.5 |
| | 20 | 80 | " | 0 | 0 | 0 |

It becomes clear from the results shown in Table 1 that the sludge mixed with normal portland cement alone is not solidified for a long time after their mixing, but the sludge mixed with the cement and Glauber's salt is solidified and its unconfined compressive strength increases with the addition of the salt, and reaches the maximum value, and then decreases the strength with the addition of the salt. It becomes also clear that the strength of solidified body increases with the addition of portland cement and Glauber's salt.

It is recognized from the result shown in Table 2 that the unconfined compressive strength of the solidified body increases with the addition of various kinds of gypsum particularly with the addition of dihydrate or insoluble anhydride and reaches the maximum value.

The same results as the above were also obtained when potassium sulphate was used instead of Glauber's salt or when the sludge which contained other harmful substances other than phosphorous compounds was used.

The accurate action of these salts on solidifying a sludge in this invention is not clear, but it is supposed that calcium aluminosulphate is formed by the reaction of calcium aluminate with sodium or potassium sulphates, gypsum dihydrate gypsum hemihydrate, soluble gypsum anhydride, or insoluble gypsum anhydride when the sludge is mixed with hydraulic portland cement and one compound such as sodium and potassium sulphates, gypsum dihydrate gypsum hemihydrate, soluble gypsum anhydride, and insoluble gypsum anhydride, the substances which give harmful effect on the setting of the hydraulic portland cement are adsorbed and fixed on the surface of thus formed calcium aluminosulphate and the setting of cement is not disturbed. On the contrary, it is supposed that the calcium aluminosulphate can not be formed by mixing the sludge and the cement with aluminium sulphate, iron sulphate and, ammonium sulphate.

In the embodiment of the present invention, normal portland cement, high early strength portland cement, superhigh early strength portland cement, moderate heat portland cement or mixed portland cement such as silica cement and blast furnace slug cement will be used as hydraulic portland cement. Sodium sulphate or potassium sulphate gypsum dihydrate gypsum hemihydrate (calculated as anhydride) soluble gypsum anhydride or insoluble gypsum anhydride may be used 5 – 50% by weight, preferably 10 – 30% by weight to the hydraulic portland cement. The present invention can be applied to a sludge in which water is contained over 70% by weight. The added total amount of the hydraulic portland cement and sodium or potassium sulphate, gypsum dihydrate gypsum hemihydrate, soluble gypsum anhydride and/or insoluble gypsum anhydride is preferably 10 – 30% by weight to the weight of the sludge.

It becomes unnecessary to analyse a sludge to identify the presence of substances having harmful effect on the setting of the hydraulic portland cement, because the sludge having such harmful substances can be also solidified according to the present invention.

EXAMPLE 1

160 g of normal portland cement and 40 g of anhydrous sodium sulphate were added to 1 kg of a sludge obtained from the bottom of Dokai Bay which contained 80% of water and 3% of zinc and 10% of humic substances, mixed thoroughly and poured into the mould having inner diameter of 50 mm and height of 100 mm. The mould was allowed to stand for 24 hrs. in a humid box having 90% of relative humidity to solidify the sludge. Unconfined compressive strength of the solidified specimen was 4.3 kg/cm². When the same specimen was cured in water at 20 ± 1°C and the strength of the specimen attained to 6.8 kg/cm² at the age of 3 days and 9.2 kg/cm² at the age of 7 days.

40 g of gypsum dihydrate was added instead of anhydrous sodium sulphate to the same sludge as the above and the solidified specimens were prepared by the same condition as the above. Unconfined compressive strength of the solidified specimens were 2.3 kg/cm² at the age of 24 hrs. When the same specimens as the above were cured in water at 20 ± 1°C, the strength of the specimen attained to 3.8 kg/cm² at the age of 3 days and 4.0 kg/cm² at the age of 7 days.

To compare with the above results, when the sludge was solidified with only normal portland cement, the hardened specimens having the strength of 0.2 kg/cm² at the age of 3 days and 0.3 kg/cm² at the age of 7 days were obtained.

EXAMPLE 2

255 kg of normal portland cement and 45 kg of anhydrous sodium sulphate were mixed thoroughly with 2 tons of the same sludge as that used in the experiments shown in Table 1 and 2 and the mixture was letted to flow in 30 cm thick on a concrete floor. The mixture began to solidify after 3 hrs. and 150 t/m² of the strength of the solidified body was measured by cone penetrometer. The solidified body was not broken down by rain nor washed away with rain and did not show the decrease of the strength.

EXAMPLE 3

170 g of normal portland cement and 30 g of anhydrous sodium sulphate were mixed with the sludge obtained from bottom of Tagonoura Harbor which containes 89% of water and over 80% of organic substances, the mixture was poured into the mould having inner diameter of 50 mm and height of 100 mm and the mould was allowed to stand for 24 hrs. in a humid box. Unconfined compressive strength of the specimen was 0.3 kg/cm². When the same specimens as the above were cured in water at 20 ± 1°C, the specimens showed the strength of 0.9 kg/cm² at the age of 3 days and 1.8 kg/cm² at the age of 7 days.

30 g of insoluble gypsum anhydride was added instead of above anhydrous sodium sulphate and the solidified specimens were prepared as above. Unconfined compressive strengthes of the solidified specimen was 0.2 kg/cm² after standing for 24 hrs. and 0.5 kg/cm² at the age of 3 days and 1.3 kg/cm² at the age of 7 days when the specimens were cured in water at 20 ± 1°C.

To compare with the above results, the sludge was solidified without adding anhydrous sodium sulphate and its unconfined compressive strength was only 0.1 kg/cm² at the age of 7 days.

EXAMPLE 4

170 g of normal portland cement and 30 g of anhydrous sodium sulphate were mixed with 1 kg of the sludge obtained from the bottom of Tsusen River which contained 83% of water and 30% of cracked petroleum substances and showed remarkable anaerobic fermentation. The mixture was poured into the mould as in Example 1 and the mould was cured as in Example 1. The strength of the specimen was 0.9 kg/cm² at the age of 24 hrs., 1.9 kg/cm² at the age of 3 days and 3.5 kg/cm² at the age of 7 days.

To compare with the above results, the sludge was tried to be solidified without adding anhydrous sodium sulphate, but any solidified body was not obtained.

What is claimed is:

1. A method for solidifying a sludge having a high water/solid ratio and containing a substance having a harmful influence upon the setting of portland cement, where said sludge is:
   1. a sand, a silt, a clay or colloidal particles which contains a sugar; a cracked petroleum substance; a fat; a humic substance; an oxide, a sulfide, a chloride or a hydroxide of copper, lead or zinc; a phosphoric acid; an inorganic phosphate or an organic phosphorous compound, or
   2. a mud which contains substances discharged from a metal mine, said method comprising mixing 90 – 70% by weight of the sludge and 10 – 30% by weight of a mixture which consists of 95 – 50% by weight of a hydraulic portland cement and 5 – 50% by weight of sodium sulphate, potassium sulphate, gypsum dihydrate, gypsum hemihydrate, soluble gypsum anhydride or insoluble gypsum anhydride.

2. The method as claimed in claim 1, wherein said hydraulic portland cement is at least one portland cement selected from the group consisting of normal portland cement, high early strength portland cement, superhigh early strength portland cement, moderate heat portland cement and mixed portland cement.

3. The method as claimed in claim 1, wherein 10 – 30% by weight of sodium sulphate, potassium sulphate, gypsum dihydrate, gypsum hemihydrate, soluble gypsum anhydride or insoluble gypsum anhydride is added to the hydraulic cement.

4. The method as claimed in claim 1, wherein 10 – 30% by weight of gypsum dihydrate or insoluble gypsum anhydride is added to the hydraulic cement.

* * * * *